June 4, 1968 R. E. HALL 3,387,173
CATHODE RAY TUBE PHOSPHOR ERASURE SYSTEM
Filed Feb. 7, 1966

INVENTOR
RICHARD E. HALL
BY Donald F. Voss
ATTORNEY

United States Patent Office 3,387,173
Patented June 4, 1968

3,387,173
CATHODE RAY TUBE PHOSPHOR ERASURE SYSTEM

Richard E. Hall, Rochester, Minn., assignor to International Business Machines Corporation, Armonk, N.Y., a corporation of New York Filed Feb. 7, 1966, Ser. No. 525,685
7 Claims. (Cl. 315—10)

ABSTRACT OF THE DISCLOSURE

A photomultiplier tube is used to detect scanning of the aged and unaged portions of the phosphor area on the face of the cathode ray tube, with the output of the photomultiplier tube being applied to a logic circuit. The logic circuit is used to increase the beam intensity while scanning the unaged portions of the phosphor and to decrease the beam intensity while scanning the aged portions, thereby compensating for selective aging by erasure of the phosphor in the unaged portions.

This invention relates to apparatus for erasing preferential aging patterns on the phosphor of a cathode ray tube and more particularly to a beam intensity control loop for a cathode ray tube.

The invention finds particular utility for a cathode ray tube utilized as a scanner in a character recognition system. The conversion efficiency of phosphors used in cathode ray tubes tends to degrade with use. This degradation of conversion efficiency is called aging. Preferential aging occurs when the beam of the cathode ray tube repetitively takes the same path. This particularly occurs when a cathode ray tube is used as a scanner in a character recognition system where the documents scanned have a fixed format. In character recognition systems, it is quite common to switch from a reading to an aging mode when the beam is not scanning a character. When the beam is being deflected in the aging mode, it traverses substantially the entire area of the phosphor. However, prior art systems, when operating in the aging mode, do not have the ability to erase or even out the preferential aging patterns on the phosphor.

Since there is no known practical way to reactivate the phosphor in the aged areas to bring up the conversion efficiency thereof to the level of the conversion efficiency of the unaged areas, in this invention the conversion efficiency of the unaged areas is brought down to the level of the aged areas in order to effect erasure of preferential aging. Thus, in this invention when operating in an aging mode, the beam density incident upon unaged areas is made greater than that upon aged areas. Therefore, the phosphor efficiency of the unaged areas decreases at a greater rate than that for the aged areas and the relative difference between the levels of the two areas tends to decrease. This invention extends the useful life of the cathode ray tube to the point where its life will be dependent upon failures other than preferential aging.

Accordingly, a principal object of the invention is to provide an improved system for erasing preferential aging patterns on the phosphor of a cathode ray tube.

Another very important object of the invention is to age the unaged areas of the phosphor of a cathode ray tube at a greater rate than the aged areas and thereby effect phosphor erasure.

Still another very important object of the invention is to extend the useful life of a cathode ray tube scanner.

A more specific object of the invention is to provide a beam intensity control loop for a cathode ray tube utilized as a scanner.

Another more specific object of the invention is to provide apparatus for measuring beam intensity and phosphor conditions such as by means of a photomultiplier tube and selectively attenuate the measurement signal and feed the attenuated signal back to control the beam intensity.

The foregoing and other objects, features and advantages of the invention will be apparent from the following more particular description of a preferred embodiment of the invention, as illustrated in the accompanying drawing.

Figure 1:
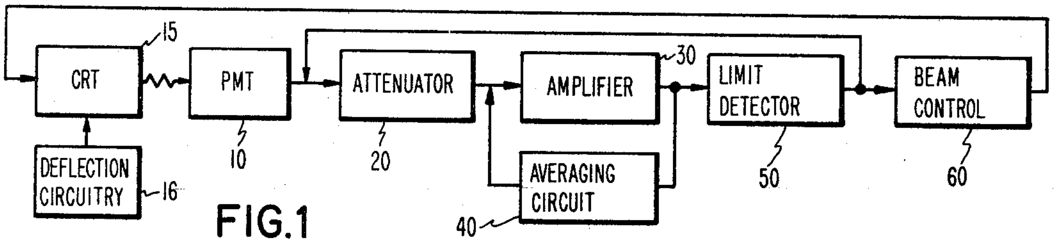
FIG. 1 is a block diagram illustrating the invention.
Figure 2:
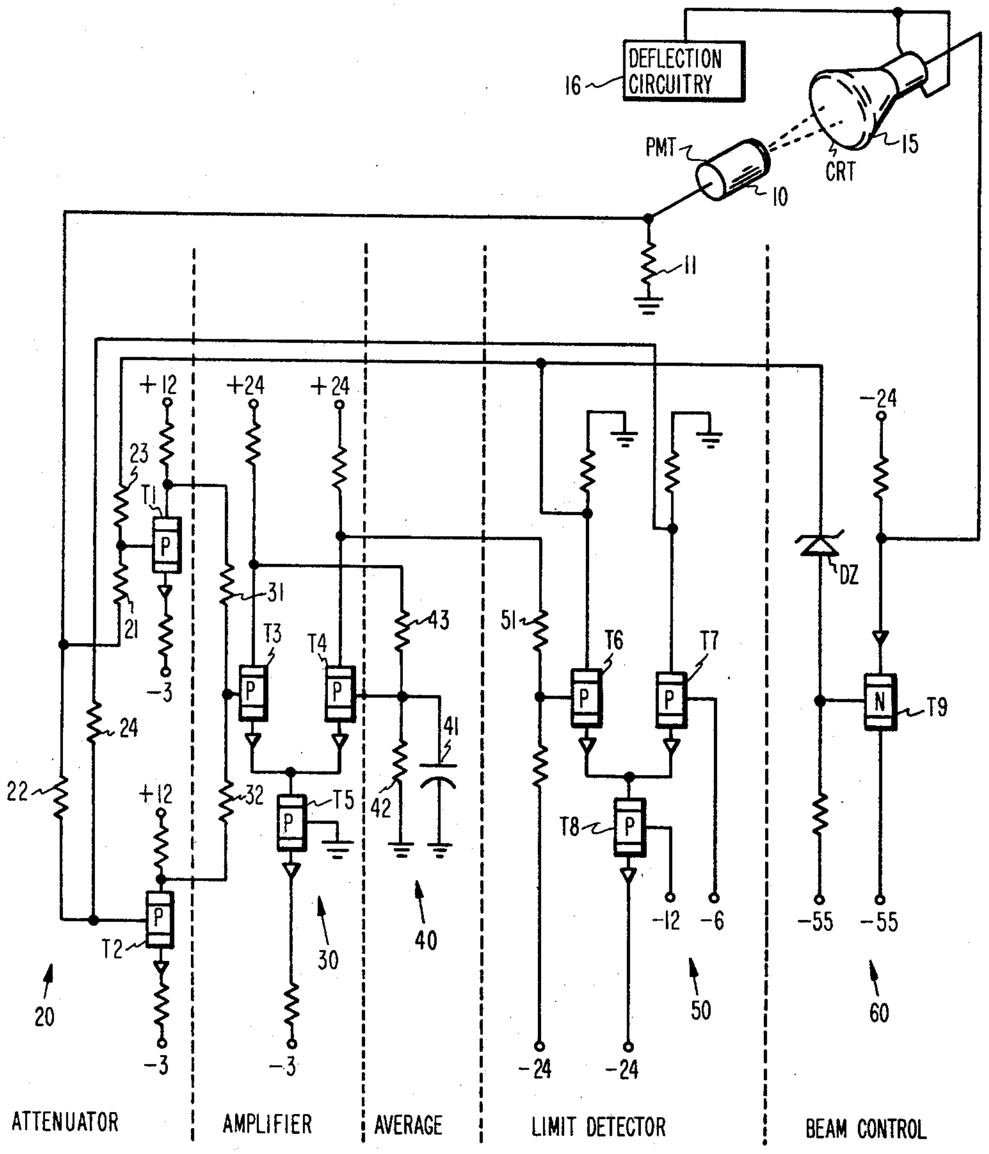
FIG. 2 is a detailed circuit diagram for the elements shown in block form in FIG. 1.

With reference to the drawing and particularly to FIG. 1, the invention is shown by way of example as including photomultiplier tube 10 for measuring the light output from cathode ray tube 15. The light output from cathode ray tube 15 is a function of beam intensity and phosphor efficiency. Thus, if beam intensity is constant, the light output varies according to the phosphor efficiency. The phosphor efficiency however, is different with respect to aged and unaged areas of the phosphor on the face of the cathode ray tube 15. If the electron beam density incident upon an unaged area is made to be greater than that incident upon an aged area, then the phosphor efficiency of the unaged area decreases at a greater rate than that for the aged area and the relative difference between the two levels for the two areas decreases. Therefore, in order to effect erasure of the preferential aging pattern, the current to the control grid of the cathode ray tube 15 is made to be higher when the beam is being deflected in a relatively unaged area and lower when in an aged area. The preferential aging, of course, occurs whenever the beam of the cathode ray tube 15 is caused to repetitively take the same path when traversing the face of the cathode ray tube. This occurs quite frequently when a cathode ray tube is used as a scanner in a character recognition machine. In such machines, the beam takes a particular path when scanning characters; however, the operation switches to an aging mode when characters are not being scanned. During the aging mode, the beam is deflected in a large raster over the entire area of the face of the cathode ray tube. This type of deflection is so well known in the prior art that further description thereof is not necessary.

Since the light output from the beam of the cathode ray tube 15 is a linear function of beam intensity and phosphor efficiency, the light intensity incident upon photomultiplier 10 can have the following four values:

high current, aged=10A
high current, unaged=10U
low current, aged=A
low current, unaged=U The output signal from photomultiplier tube 10 is a linear function of the incident light, and will either be passed by attenuator 20 or attenuated by a constant factor, and in this example by one tenth depending upon the binary state of limit detector 50. If the limit detector 50 is in the zero state, the signal from 10 is unattenuated. On the other hand, if 50 is in the one state, the signal from 10 is attenuated by a factor of 1/10. By this arrangement, the output signal from 20 can be at the following possible levels:

| Photomultiplier Tube 10 | Limit Detector 50 | Attenuator 20 |
|---|---|---|
| 10A | 1 | A |
| 10U | 1 | U |
| A | 0 | A |
| U | 0 | U |
| 10A | 0 | 10A |
| 10U | 0 | 10U |
| A | 1 | 1/10A |
| U | 1 | 1/10U |

In this example, the last four possible output levels from attenuator 20 are not permitted. This is due to the construction of the system, as will be seen later herein. The output from attenuator 20 is fed to amplifier 30 and its output is fed back through averaging circuit 40 to the input of amplifier 30. If the input to 30 is greater than the average, the output thereof is greater than zero. Conversely, if the input to 30 is less than average, the output thereof is less than zero. Therefore, in this particular instance, since the signal U is greater than A, then U is greater than average. Amplifier 30 as will be seen later herein is a differential type amplifier, although a capacitively coupled amplifier could be used.

Limit detector 50 is connected to the output of amplifier 30 and has two possible outputs depending upon the output signal from 30. When the output signals from 30 are greater than zero and less than zero, the outputs of limit detector 50 are at one and zero levels respectively. Thus as the signal goes from U to A, the output of 50 switches from one to zero and as the signal goes from A to U, the signal switches from zero to one. Hence, the beam intensity is increased as the beam goes from an aged to unaged area. The output of limit detector 50 is applied to beam control circuit 60 which has its output connected to the grid of 15 to control beam intensity. The current controlled from beam control 60 is ten times as great when the limit detector 50 is in the one state and when it is in the zero state.

The output of photomultiplier tube 10 is a current proportional to light input. A voltage proportional to this current is developed across loading resistor 11. The voltage developed across resistor 11 is applied to base resistors 21 and 22 of transistors T1 and T2 respectively. The bases of transistors T1 and T2 are also connected through resistors 23 and 24 through the collectors of transistors T6 and T7 respectively. Thus when transistors T6 and T7 are conducting, their associated transistors T1 and T2 are biased off. However, as it will be seen later herein, only one of the transistors T6 and T7 can be conductive at any one time and therefore, either transistor T1 or T2 will be conductive but not both. When transistor T6 is no-conductive, transistor T1 is conducting and the signal from photomultiplier 10 is attenuated by a factor of approximately 20 to 1. Conversely, when transistor T7 is non-conductive, transistor T2 is conducting and the signal from 10 is attenuated by a factor of approximately 2 to 1. The collectors of T1 and T2 are connected to base resistors 31 and 32 of transistor T3 which together with transistors T4 and T5 form a differential amplifier 30.

Transistor T5 functions as a constant current source for transistors T3 and T4. The base of T4 is connected to the averaging circuit 40 which consists of capacitor 41 connected in parallel with resistor 42 and both connected in series with resistor 43, which is also connected to the collector of T3. The output of amplifier 30 is taken from the collector of T4 and is applied to base resistor 51 for transistor T6. The average circuit 40, it is seen, is an RC integrator and functions to maintain the output signal from the collector of T4 around a constant average value of averaging the signal from T3 and applying it to the base of T4.

Limit detector 50 consists of transistors T6, T7 and T8 connected in a differential amplifier configuration which is used as a switching network by biasing the base of T7 at a constant potential. Transistor T6 is rendered conductive when the base of T3 is more positive than the base of T4. When this occurs, the collector of T6 is considered to be at the zero level. On the other hand, when the base of T3 is at a lower potential than the base of T4, T6 is not conducting and its collector is at the one level. The base of transistor T9 is connected to the collector of T6 throught Zener diode DZ. The emitter of transistor T9 is connected to the control grid of the cathode ray tube 15. When the emitter of T9 is most positive, the control grid of 15 is most positive and the beam current is intensified. When the emitter of T9 is most negative, the beam current is diminished. Thus, when T9 is conducting, T1 is conducting and the input signal to T1 is attenuated by a factor of 20 to 1. When T9 is non-conductive, T2 is conducting and the input signal to T2 is attenuated by a factor of 2 to 1.

From the foregoing, it is seen that this invention functions to erase preferential aging of the face of a cathode ray tube by increasing the beam intensity when the beam is in an unaged area and diminishing the beam intensity when the beam is in an aged area. Further, by erasing the preferential aging patterns on the face or phosphor of the cathode ray tube, the useful life thereof is extended. This is particularly important because with present technology, a cathode ray tube and particularly a high resolution cathode ray tube is a very expensive component.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Apparatus for erasing preferential aging patterns from the face of a cathode ray tube comprising:
   means for detecting aged and unaged areas of the face of said cathode ray tube; and
   means responsive to the beam of the cathode ray tube being in unaged and aged areas for increasing and decreasing beam intensity respectively.

2. Apparatus for effectively erasing preferential aging patterns from the face of a cathode ray tube comprising:
   a photomultiplier tube positioned to view the face of said cathode ray tube and providing an output signal as a function of beam intensity and of the beam being in aged and unaged areas as the beam is deflected over the face of the cathode ray tube;
   detection means responsive to said photomultiplier output signal for being set to one and zero states when when the cathode ray tube beam goes from an aged to an unaged areas and when the beam goes from an unaged to an aged area respectively; and
   means responsive to said detection means being set to said one and zero states for increasing and decreasing the cathode ray tube beam intensity by predetermined amounts.

3. The apparatus of claim 2 wherein said detection means includes:
   a limit detector for providing the one and zero states of said detection means;
   an attenuator for passing said photomultiplier output signal when the beam is in the aged and unaged areas and said limit detector is in the zero state and for attenuating said photomultiplier output signal a predetermined amount when the beam is in the aged and unaged areas and the limit detector is in said one state; and
   amplifying means connected to the output of said attenuator and to the input of said limit detector whereby the limit detector is set to the one state if the output of said amplifier is greater than a predetermined average and is set to the zero state if the amplifier output is less than said predetermined average.

4. The apparatus of claim 3 wherein said attenuator consists of a pair of transistors connected to receive said photomultiplier output signal in parallel and having their outputs connected to the input of said amplifying means.

5. The apparatus of claim 3 wherein said amplifying means includes a differential amplifier with a feedback loop containing an integrating circuit.

6. The apparatus of claim 3 wherein said limit detector is a differential amplifier having one element connected to the output of said amplifying means and another element biased at a constant potential.

7. The apparatus of claim 3 wherein said beam intensity control means is an emitter follower with the output thereof connected to the grid of said cathode ray tube.

References Cited

UNITED STATES PATENTS 2,817,041 12/1957 Urry ---------------- 315—10

RODNEY D. BENNETT, *Primary Examiner.*

T. H. TUBBESING, *Assistant Examiner.*